United States Patent

Boucherie

[11] Patent Number: 5,769,506
[45] Date of Patent: Jun. 23, 1998

[54] METHOD AND DEVICE FOR MANUFACTURING BRUSH BODIES

[75] Inventor: Bart Gerard Boucherie, Izegem, Belgium

[73] Assignee: Firma G.B. Boucherie, nv, Belgium

[21] Appl. No.: 644,460

[22] Filed: May 10, 1996

[30] Foreign Application Priority Data

May 10, 1995 [BE] Belgium ............................... 09500425

[51] Int. Cl.⁶ ...................................................... A46D 3/00
[52] U.S. Cl. .................................. 300/2; 300/20; 300/21
[58] Field of Search ................................... 300/2, 20, 21; 264/243

[56] References Cited

U.S. PATENT DOCUMENTS 2,923,035  2/1960  Schwartz .
5,143,424  9/1992  Boucherie ................................. 300/2

FOREIGN PATENT DOCUMENTS

| 0 504 571 | 9/1992 | European Pat. Off. . |
| 0 607 968 | 7/1994 | European Pat. Off. . |
| 1 234 237 | 10/1960 | France . |
| 2 079 455 | 10/1971 | France . |
| 673 508 | 6/1952 | United Kingdom . |

Primary Examiner—John M. Husar
Attorney, Agent, or Firm—Bacon & Thomas

[57] ABSTRACT

Method for manufacturing brush bodies, more particularly brush bodies (1) made of synthetic material, which are provided with at least one insert (2), and wherein in the insert (2) is firstly covered by injection on one side in a die (5) and subsequently on the other side also in a die.

15 Claims, 8 Drawing Sheets

Fig. 16

METHOD AND DEVICE FOR MANUFACTURING BRUSH BODIES

BACKGROUND FIELD OF THE INVENTION

This invention aims at a method and device for manufacturing brush bodies.

GENERAL DISCUSSIONGS

It is hereby an object of the invention to provide for a method and a device which allows the manufacture in an optimal way of brush bodies of synthetic material, which are provided with at least one insert, whereby this insert can be of a different nature and can consist for example of a logo, letters, numbers, or an object, such as a gadget or similar.

It is a first object of the invention to apply inserts made of synthetic material in brush bodies, but the invention can in general also be applied for inserts made of other materials, such as metal, wood, stone, and so forth.

Likewise the invention aims in particular at applying inserts, preferably coloured inserts, in a transparent brush body, whereby this insert is completely enveloped with the transparent synthetic material. However, the invention does not exclude the use of non-transparent synthetic material for the brush bodies. Likewise the invention does not exclude the possibility that the inserts are not fully enveloped. Indeed, according to the method of the invention the inserts could also be mounted in such a way that they are seated against the outer surface of the brush body.

Likewise the invention is particularly intended for toothbrushes, but can evidently be used for other brushes.

For this purpose the object of the invention is in the first place a method for manufacturing brush bodies, more particularly brush bodies made of synthetic material provided with at least one insert, characterized in that the insert is firstly covered by injection at one side with synthetic material in a die and subsequently further covered by injection at the other side, whereby the injected material defines the final shape of the brush body.

According to a preferred embodiment the method successively provides in the clamping of the insert in and/or against the die wall of a first die; the filling with synthetic material of the die cavity of the first die which is adjacent to the insert; presenting the semi-finished product obtained from the first die, in which the insert is at least partly enveloped, to a second die, with the insert adjacent to the die cavity of the second die; and the filling of the second die with synthetic material, whereby the die cavities of the abovementioned dies define the shape of the brush body to be manufactured.

According to the most preferred embodiment the insert is made of synthetic material and previously moulded by injection in an additional third die, whereby a part of this die is used to subsequently act as the die wall of the first die, and whereby the insert remains in this part during the filling of the first die. In such way the insert remains most favourably positioned during the filling of the first die and automatically a perfect fit of the die wall around the insert during the injection moulding process in the first die is offered.

Likewise the invention aims at a device for realizing the aforementioned method, characterized in that it consists in the combination of at least a first die for forming a portion of the brush body; means to hold an insert in the wall of this first die; a second die intended to finish the brush body; transfer means to transfer the portion of the brush body, formed in the first die, together with the insert partly enveloped therein, from the first die to the second one; and filling means to fill the dies with synthetic material.

The means to hold an insert in the wall of the first die preferably consist of cavities provided in this wall, exactly corresponding with the shape of the insert, and thus providing for a seal of the die cavity of the first die around the insert.

A particular embodiment is characterized in that it is provided with a third die for forming the insert, preceding the aforementioned first die, which is also provided with filling means for filling the concerned die cavities with synthetic material; in that the third die is composed of several parts and can thereby be opened in such way that the insert formed herein can be partly and slidably removed thereout; and in that the device is provided with on the one hand, transfer means to transfer the insert from the third die to the first die, while it remains clamped in the cavities of a part of the third die, and, on the other hand, means to partly remove the insert from the cavities, in such way that the protruding portion of the insert ends up in the die cavity of the first die.

More particularly this device is characterized in that the third die is composed of three parts and consists of a plate provided with cavities in the shape of the insert to be formed and two closing elements to close off these cavities during the injection, whereby this plate is mutually movable between the third and the first die, whereby it can operate as a wall of the first die; and in that the means to partly remove the insert from the opened die, in this case from said plate, consist of plungers or similar which can be inserted into the cavities of the plate.

DESCRIPTION OF THE DRAWINGS

With the aim to better show the characteristics of the invention some preferred embodiments are described hereafter, without limitative character, reference being made to the accompanying drawings, in which

FIG. 2 to 7 schematically represent different steps of the method of the invention as well as the obtained products;

FIGS. 8 and 9 schematically represent two steps according to the method of the invention, which according to the most preferred embodiment precede the step represented in FIG. 2;

DETAILED DESCRIPTION

Figure 1:
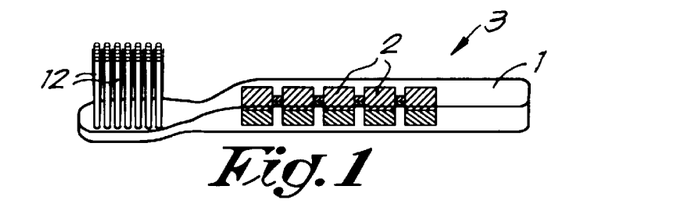
FIG. 1 represents a tooth-brush with a brush body which has been provided with an insert according to the method of the invention.

As represented at FIG. 1 the invention relates the manufacture of brush bodies 1, which are provided with at least one insert 2, which in the represented embodiment is composed of a series of interconnected block-shaped elements, but in practice, however, as said in the introduction, can take other shapes as well.

As represented in FIG. 1 the invention is in the first place intended for the manufacture of brush bodies 1, handles included, of tooth-brushes 3, with the intention to obtain that the insert 2 is fully enveloped in the brush body 1.

As schematically represented in FIGS. 2 to 7, according to the invention a method is provided whereby the insert 2 is firstly covered by injection molding at one side in a die and subsequently is coverd at the other side by injection molding.

Figure 3:
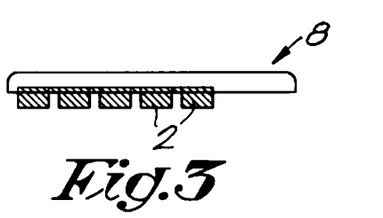
Figure 4:
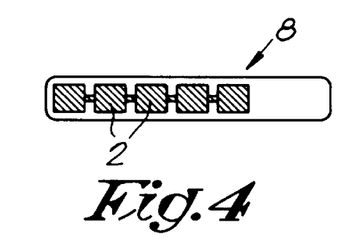

In a first step, as represented schematically in FIG. 2, the insert 2 is hereby presented to the die cavity 4 of a first die 5 to be described in more detail below, whereby the insert is clamped in the die wall 6 of this die 5. Preferably the insert 2 protrudes partly from the die wall 6 while the non-protruding part is hold by cavities 7 in the die wall 6, which exactly match the shape of the insert 2. By filling the die 5 with synthetic material, a first semi-finished product 8 as represented in FIGS. 3 and 4 is obtained, which respectively show an elevational view and a bottom view of the obtained semi-finished product 8.

Figure 5:
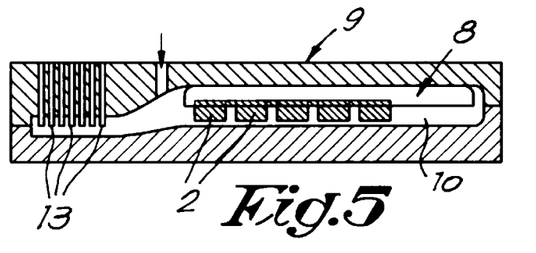
Figure 6:
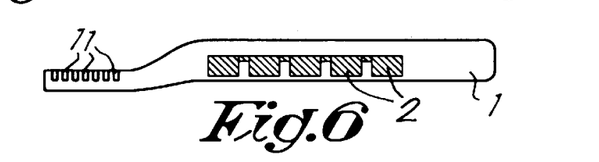

Subsequently, as represented in FIG. 5, the semi-finished product 8, in which the insert 2 is at least partly enveloped, is presented to a second die to be described in more detail below with the insert 2 adjacent the die cavity 10 of this second die 9, respectively introduced herein. By the subsequent filling with synthetic material of the second die 9 a brush body 1 is obtained in which, as represented in the elevational view of FIG. 6 and the top view of FIG. 7, the insert 2 is fully enveloped.

It is to be noted that simultaneously openings 11 for the fibre bundles 12 can be formed in the brush body 1, provided that appropriate pins 13 or such like are positioned in the die 9.

In another embodiment these pins 13 can be replaced by fibre bundles which are previously inserted whereby the latter by injection are directly embedded in the brush body 1, the ends of the fibre bundles having been melted together previously or not.

Figure 8:
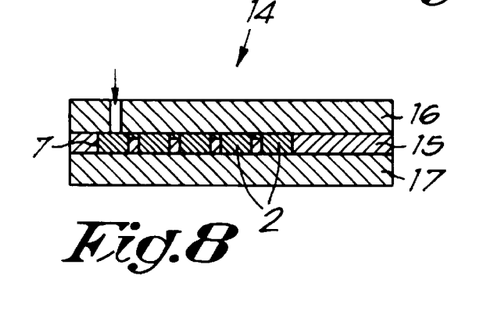

According to a preferred embodiment use is made of an insert 2 made of synthetic material, which precedingly, as represented in FIG. 8, is injected in a die, hereinafter defined as third die 14 also to be describe below. Preferably this third die 14 is of such a shape that a part 15 of this die 14 can be used to subsequently act as the wall 6 of the first die 5.

As represented in FIG. 8 the third die 14 can to this end be composed of three parts, on the one hand the aforementioned part 15 which is provided of continuous cavities 7 for the injection moulding of the insert 2 and two closing elements 16 and 17 to close the cavities 7.

After the cavities 7 have been filled with synthetic material and the closing elements 16–17 have been removed after setting of the synthetic material, according to the method of the invention the part 15 is presented to the first die 5, whereby the insert 2 is partly pushed out of the cavities 7, for example such as schematically represented in FIG. 9 by the arrows 18. It is clear that in doing so, the insert 2 remains most favourably positioned and that no separate positioning means are necessary.

In order to realize the foregoing method preferably a molding device 19 as represented in FIGS. 10 to 14 is used.

Figure 2:
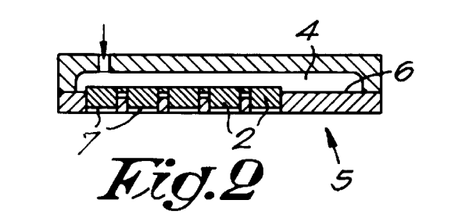

According to the preferred embodiment this device 19 consists in the combination of the aforementioned first die 5, for forming a portion of the brush body 1, more particularly the aforementioned semi-finished product 8; clamping means 20 to hold the insert 2 in and/or against the wall 6 of the first die 5 see figure 2; a second or finish molding die 9 intended to complete the brush body 1; transfer means 21 to transfer the semi-finished product 8 formed in the first die 5, together with the insert 2 partly enveloped therein, to the second die 9; third or insert molding die 14 preceding the first die 5; transfer means 22 to transfer the insert 2 formed in the third die 14 to the first die 5; and filling means described hereafter to fill the dies 5-9-14 with synthetic material.

As represented in the figures the different dies 5-9-14 are integrated in a common die 19.

Figure 11:
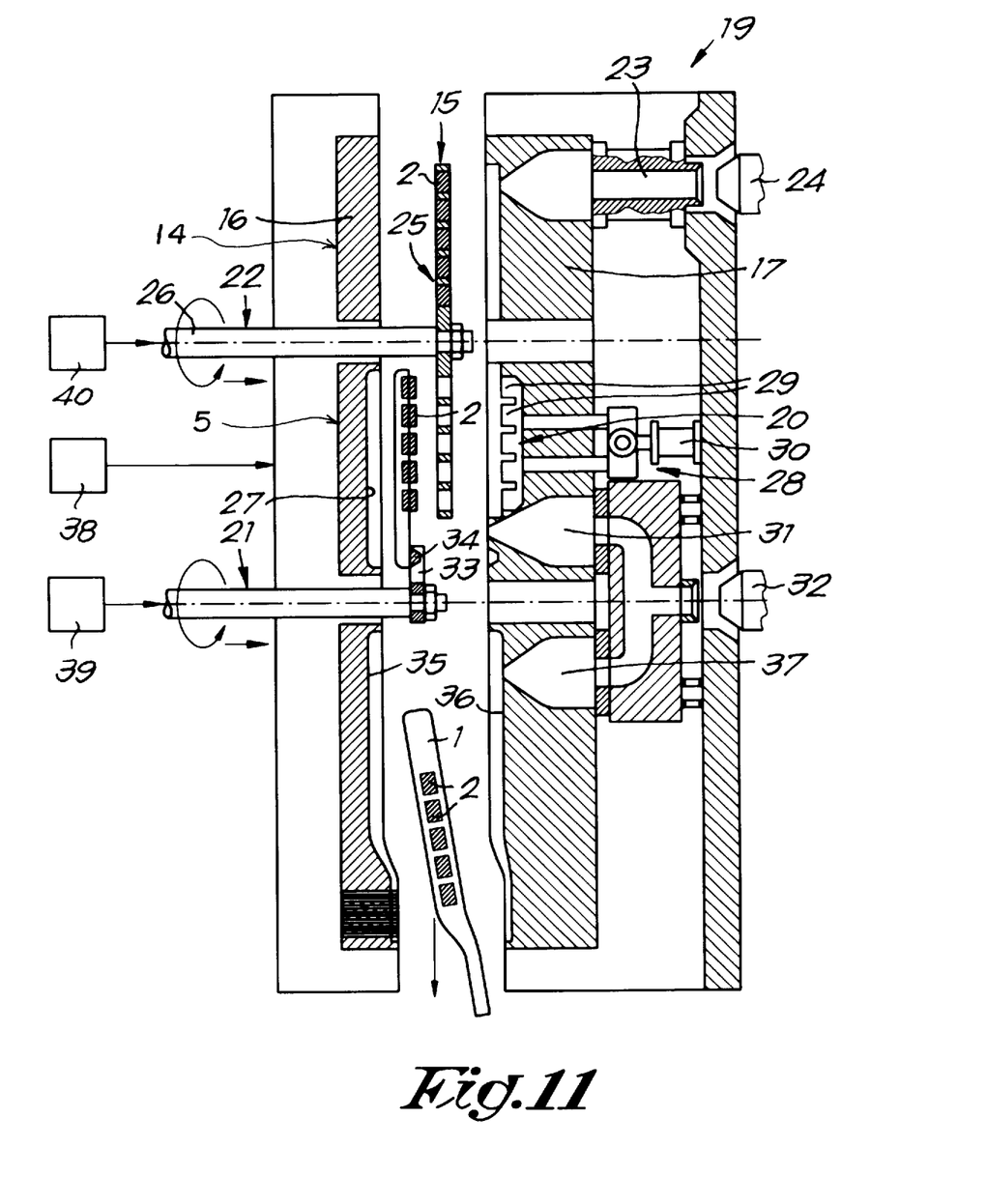
FIG. 11 represents the device as shown in FIG. 10 in open position of the dies.

The aforementioned third die 14, which in sequence is positioned first consists, similar to the schematic representation of FIG. 8, of a part 15 which is provided with cavities 7, and closing elements 16 and 17, cooperating therewith, whereby these three parts can separated upon opening the die block, as represented in FIG. 11.

Figure 14:
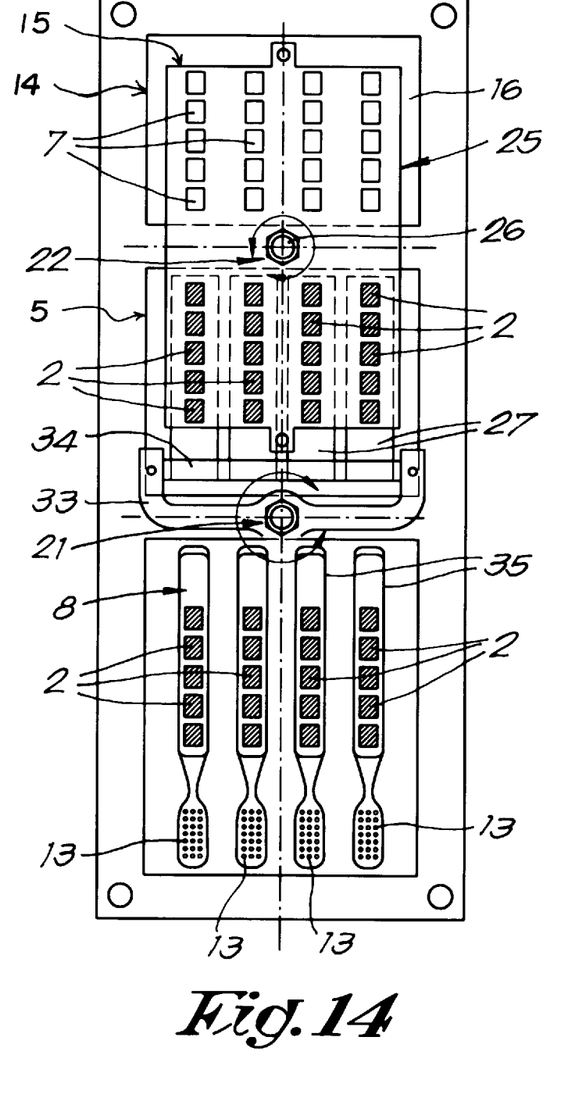
FIG. 14 represents a sectional view according to the line XIV—XIV in FIG. 13.

As represented in FIG. 14, the part 15 can be provided with a great number of cavities 7 for simultaneously forming several inserts 2.

The third die 14 is provided with an inlet 23 which can cooperate with an injection nozzle with which the synthetic material of the insert 2 can be injected in the cavities 7.

The aforementioned transfer means 22 mainly consist of a symmetrically built-up turning plate 25, composed of two of the aforementioned parts 15, whereby by turning, alternately the first or the second part 15 can cooperate with the third die 14 and the first die 5, and vice versa. This turning plate is fixed on a shaft 26 which by appropriate driving can be turned over 180 degrees.

The turning plate 25 also operates as a means 20 to hold the insert 2 in a suitable way in the die cavity 4, as represented in FIG. 2. It is evident that as a variant use could be made of a slidable plate.

The aforementioned first die 5, which in sequence of positioning is situated after the third, shows, similar to the schematic representation of FIG. 2, at least one die cavity 4, and in this case several of such die cavities 4, whereby each die cavity 4 is defined by a permanent die wall corresponding to die wall 27 and a die wall 6 which alternately would be formed by the one or the other part 15 of the turning plate 25.

The first die 5 is provided with means 28 to sideways push each insert 2, which is situated in the part 15 presented to the die 5, out of the die wall 6 resulting in that such insert 2 is partly protruding thereout and still is clamped. These means 28, in the example as represented in FIGS. 10 to 13, consist in a sliding mechanism with plungers 29, which can be moved by means of a driving element, such as a pressure cylinder 30, and which can exert a force at the back side of each insert 2 and also can provide a displacement of each insert 2.

The first die can be filled with synthetic material by means of an inlet 31 which can cooperate with an injection nozzle 32.

The transfer means 21 between the first die 5 and the second die 9 consist, as can best be seen in FIG. 14, mainly of a driven rotary arm 33, which at the desired intervals can also be turned over 180 degrees, and a partly envelopable transfer part 34 connected to the rotary arm 33, with which the semi-finished products 8 FIG. 3 can be moved from the first die 5 to the second die 9. The exact built-up and operation of this transfer means 21 are clearly depicted in European patent application No. 0.504.571 of the Applicant. The transfer part 34 can of course be moved in other ways;

it can for example be moved in a linear direction indicated by the arrow 34 by means of appropriate guidance.

The second die 9 shows, similar to the schematic representation of FIG. 5, at least one die cavity 10, and, as in the present case preferably several of such die cavities 10, whereby each die cavity 10 is defined by die walls 35 and 36. Filling occurs by means of an inlet 37 which also cooperates with the injection nozzle 32.

It is evident that the dies 5–9–14 are provided with the required driving means 38 so as to enable opening and closure thereof.

Likewise it is evident that the transfer means 21 as well as 22 are provided with the required driving means 39–40.

The operation of the device 19 is mainly as follows.

Figure 10:
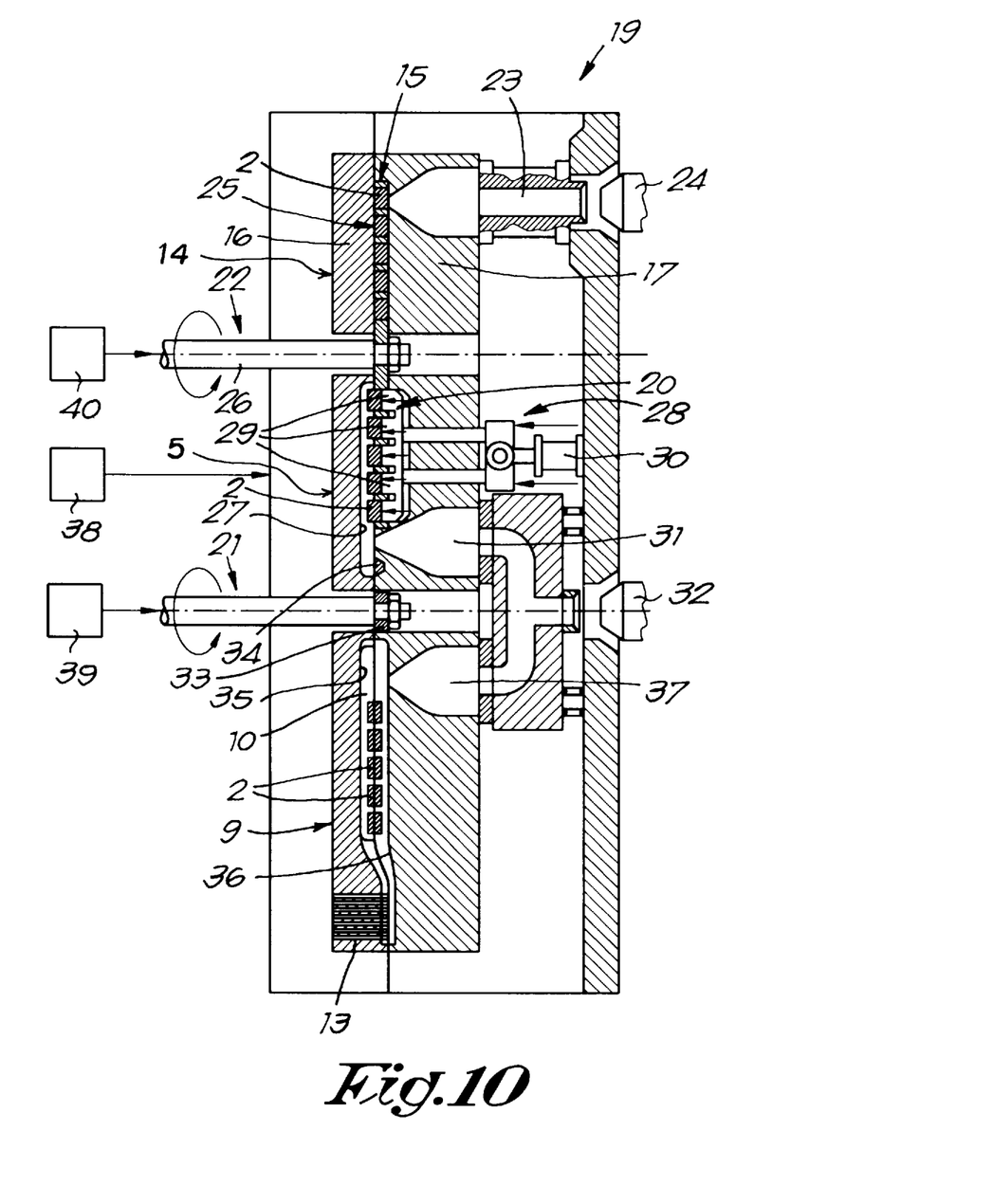
FIG. 10 represents a cross sectional view of a device according to the invention in closed position of the dies.

In a first position, as represented in FIG. 10, the dies 5–9–14 are closed. By injecting synthetic material by means of the injection nozzle 24 the cavities 7 are filled and in the third die 14 a series of inserts 2 is formed.

At the same time already formed inserts 2 are partly pushed out of the cavities 7 provided in the part 15 of the first die 5, by means of the plungers 29, whereby they remain clamped with their half in the disc-shaped part 15. Simultaneously, synthetic material is injected in the first die 5 via inlet 31.

Also at the same time a semi-finished product 8 is already present in the second die 9 and this is further finished by injecting synthetic material via inlet 37.

In a following step, as represented in FIG. 11, the dies 5–9–14 are opened, whereby care is taken that the turning plate 25 can freely move, possibly by means of a shift of the shaft 26 by means of the driving element 40. Care is also taken so as to free the semi-finished products 8 formed in the first die 5, with the exception, however, that they still are suspended to the transfer means 21, more particularly to the transfer part 34.

Likewise the shaped brush bodies 1 are removed from the device.

Figure 12:
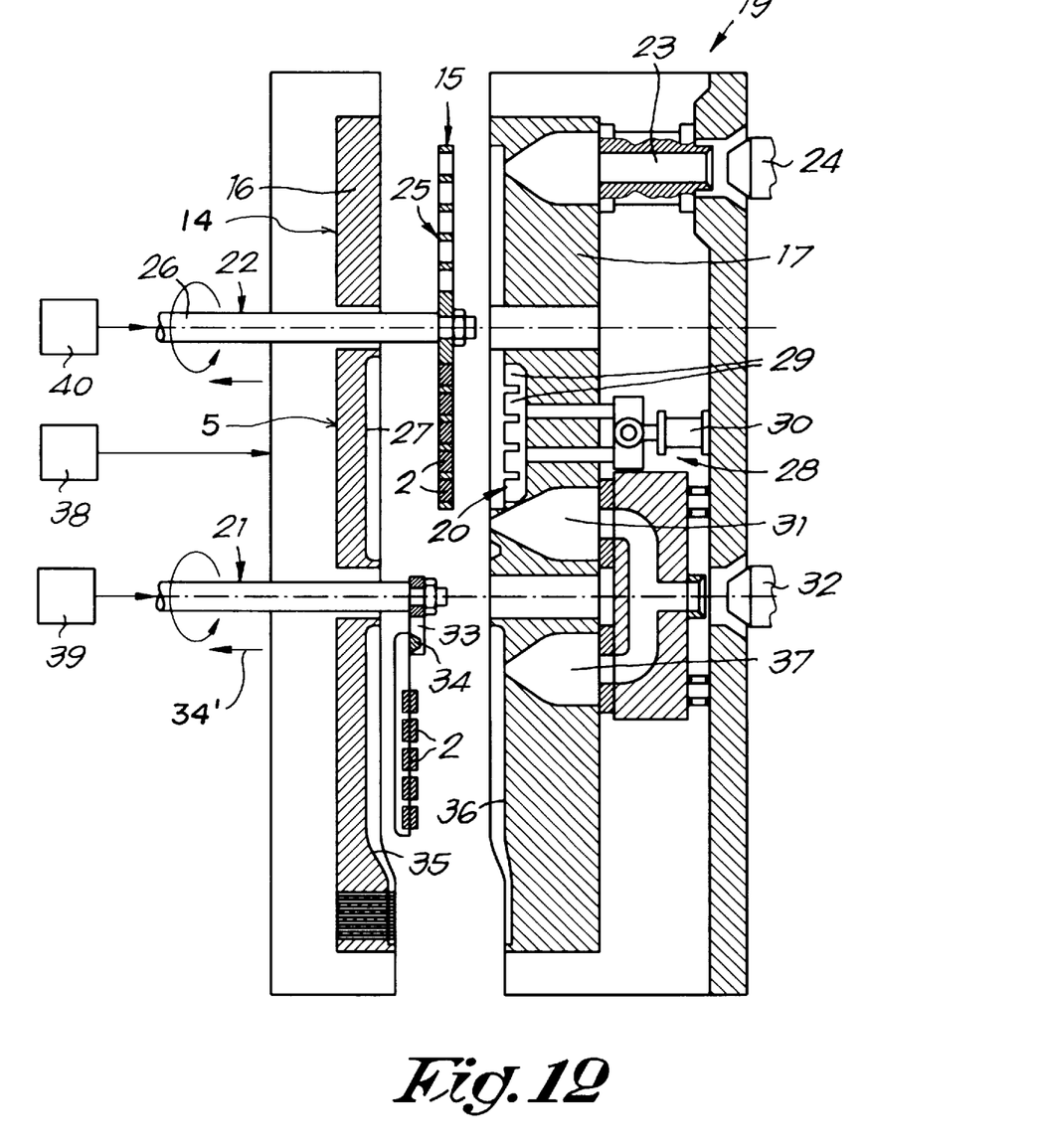
FIGS. 12 and 13 represent the device of FIG. 10 in still two other positions.

In a next step, as represented in FIG. 12, the turning plate 25 and rotary arm 33 are turned over 180 degrees.

Figure 13:
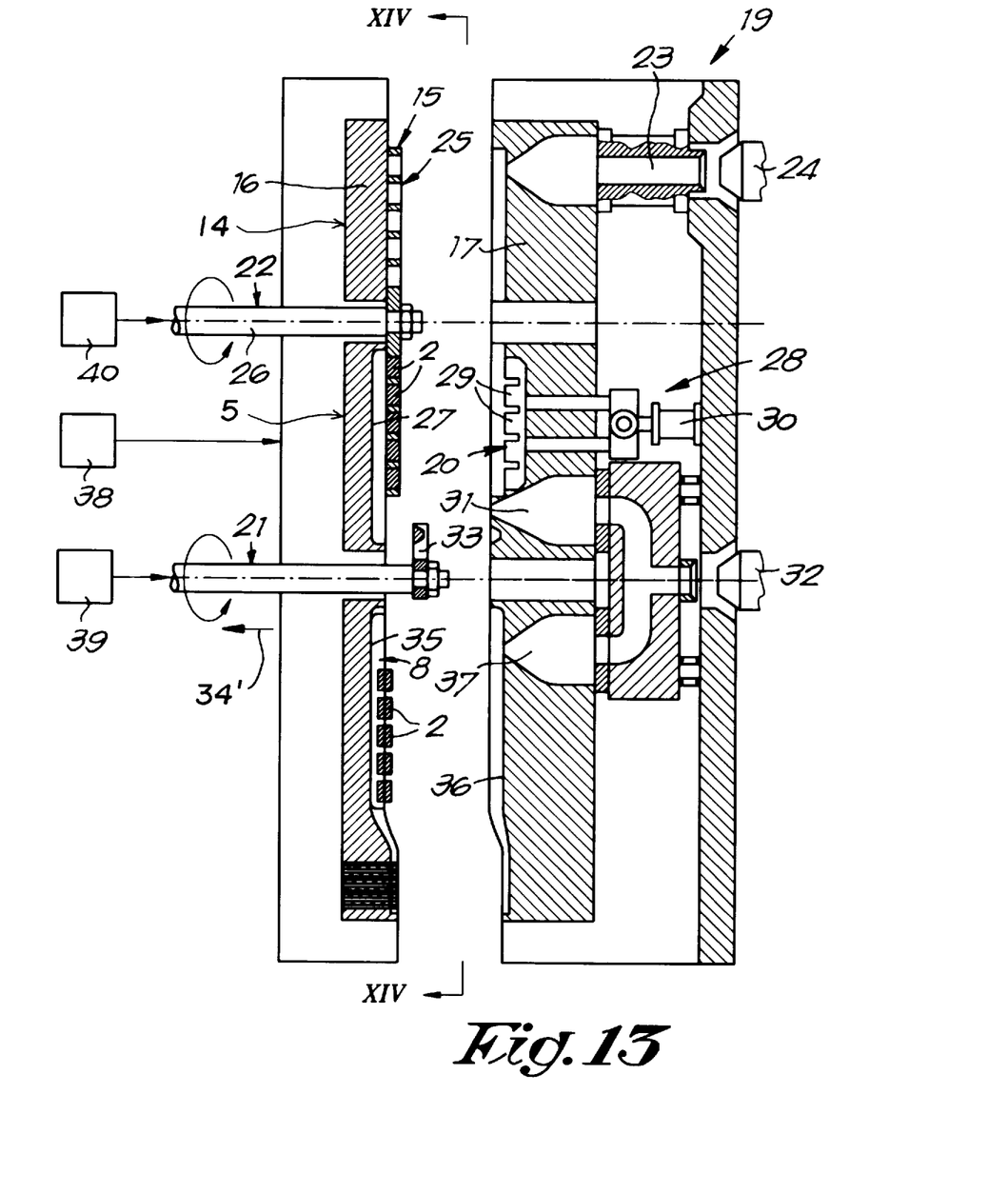

In a further step, represented in FIG. 13, the turning plate 25 is moved and the semi-finished products 8 are placed in the second die 9 by means of the transfer means 21, whereupon consecutively the transfer part 34 is turned back in its original position. Hereby the semi-finished products can be fixed or clamped with means which are not reproduced.

After closure of the dies 5–9–14 the cycle can be repeated.

It is evident that different variants are possible.

Figure 15:
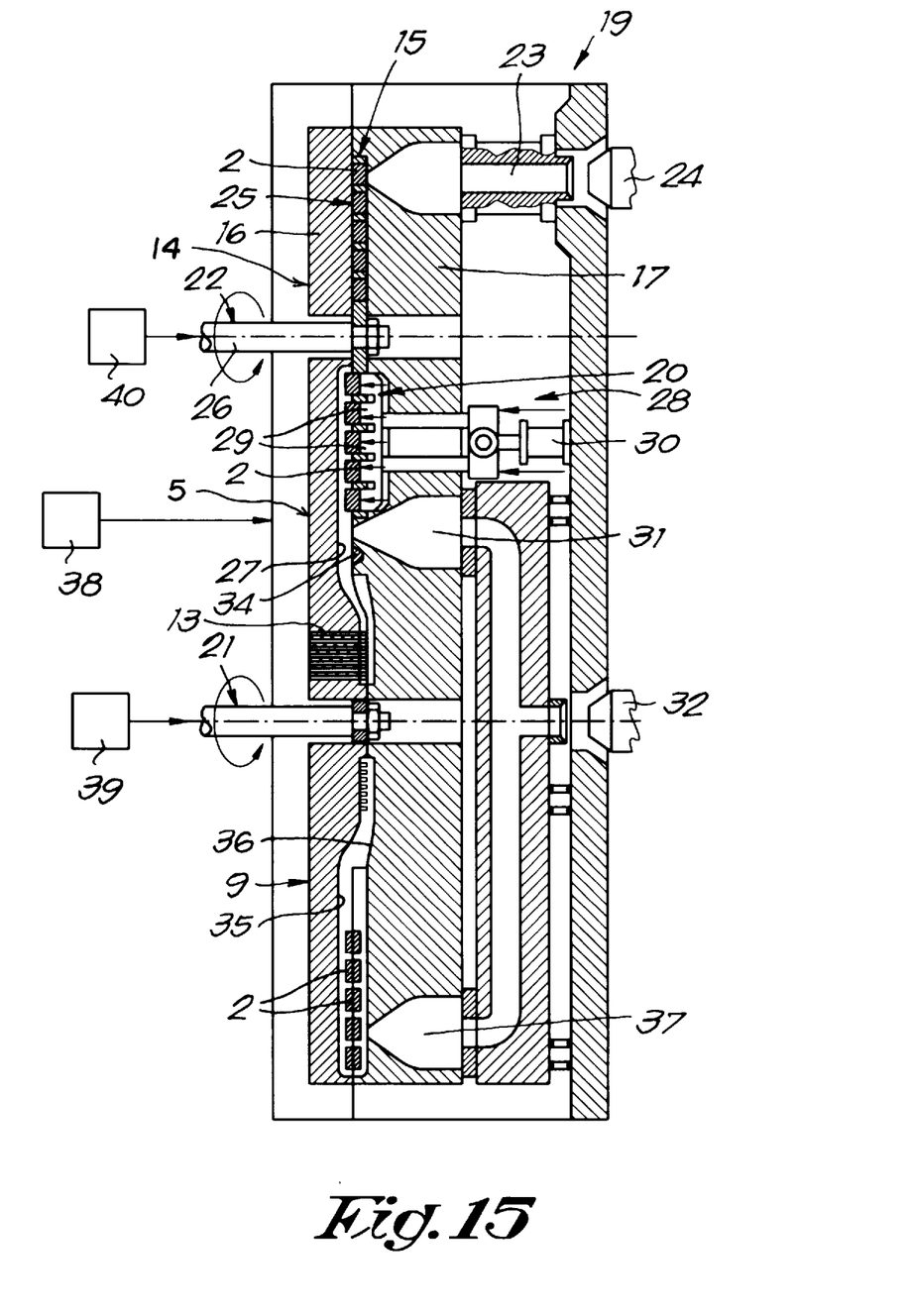
FIGS. 15 and 16 show two variants of the device according to the invention.

For example a device 19 is represented in FIG. 15 whereby a semi-finished product 8 is formed in the first die 5, already containing the head of the tooth-brush, while the brush body in the second die 9 is finished by further injecting the handle.

Figure 16:
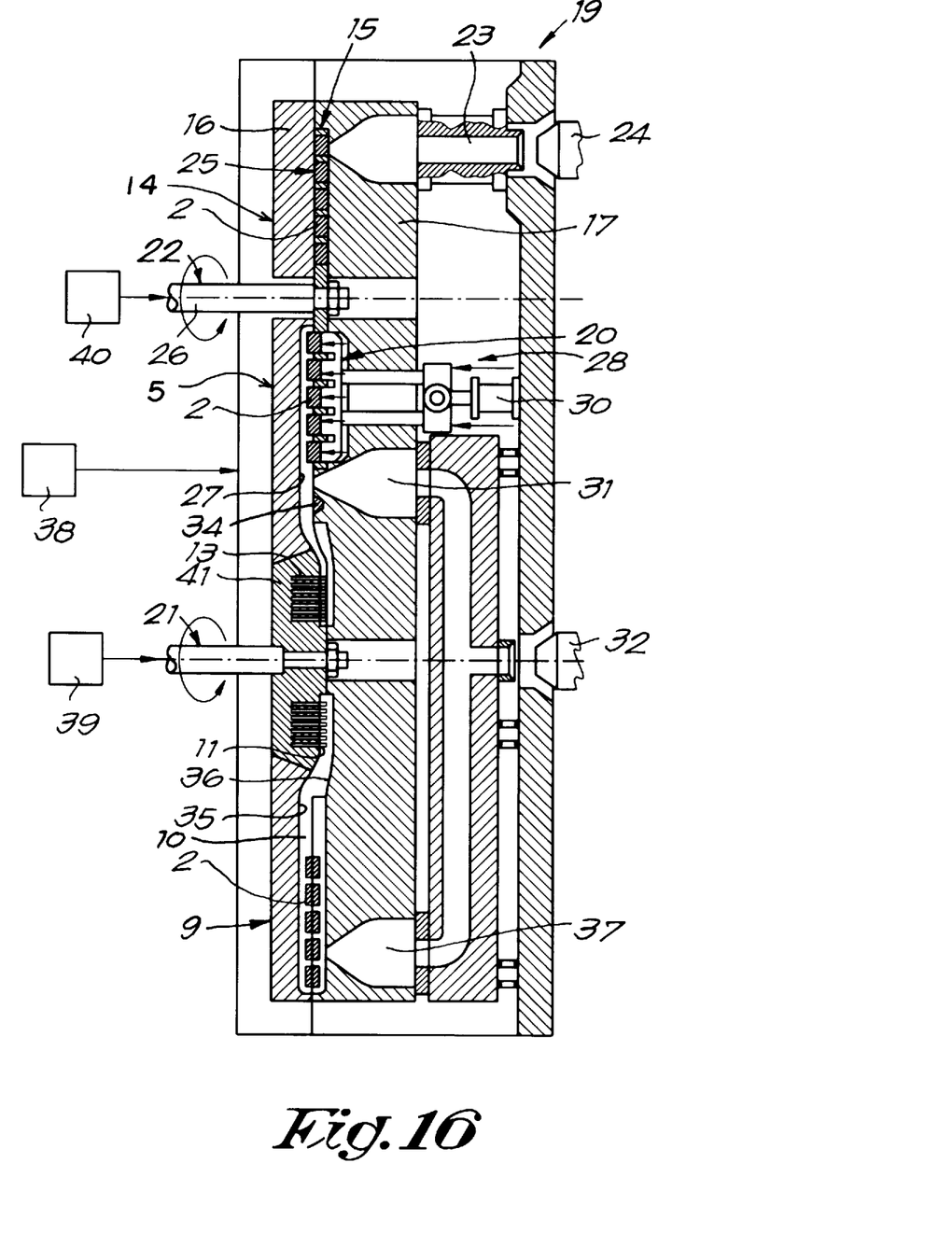

In FIG. 16 another variant is represented whereby the transfer means 21 consists of a rotary system which turns in each cycle over 180 degrees and which does not return each time to its original position, such as this was the case with transfer part 34. The semi-finished products 8 are hereby carried away by pins 13 positioned on a turn block 41 for shaping the aforementioned openings 11.

Evidently other constructions can be imagined in which the pins 13 act as transfer elements.

As set out in the introduction the main object is to shape brush bodies 1 made of a transparent synthetic material in such a way that the insert 2, which preferably consists of a non-transparent synthetic material or of a synthetic material of another colour, is clearly visible.

It is to be noted that the shading of the inserts 2 shown at the figures, indicates the use of an untransparent insert in a transparent brush body and that this shading in most of the figures does not indicate a sectional view.

It is to be noted also that the joints connecting the block-shaped elements of each insert 2 are omitted at the FIGS. 10 to 16 for the sake of clearness. In practice they are, however, needed to obtain that all cavities 7 can be filled via a common inlet 23. According to a variant, different inlets 23 can, however, be provided so as to form in this way an insert 2 composed of different fully separated parts.

For the enveloping synthetic material use can be made of CAP (Cellulose-aceto-propionate), SAN (styrene-acrylo-nitril), ABS, etc. These materials are particularly appropriate due to their high degree of transparency.

If the insert 2 is made of synthetic material, a synthetic material is chosen therefor, the melting temperature of which is above the melting temperature of the enveloping synthetic material, in such way that the latter, when passing over the insert, does not melt or deform it.

Especially good results are obtained with an insert 2 made of polyamide, enveloped with CAP.

The present invention is by no means restricted to the embodiments described as an example and represented in the accompanying drawings, but such method and device for the manufacture of brush bodies can be realized according to several variants while still remaining within the scope of the invention.

I claim:

1. A method for manufacturing brush bodies made of synthetic material including at least one insert (2), comprising the steps of partially covering the insert (2) with synthetic material by injection molding synthetic material on one side of the insert in a first die (5) to form a semifinished brush body (8) retaining the insert while leaving an uncovered portion of the insert and then injection molding synthetic material in contact with the semifinished brush body over the uncovered portion of the insert in a second die (9) and molding a brush body (1) with said insert embedded therein in said second die.

2. The method according to claim 1, wherein the step of partially covering the insert with synthetic material by injection molding on one side of the insert in a first die includes releasably clamping the insert (2) in a die wall (6) of the first die (5); filling a die cavity (4) of the first die (5) adjacent the insert (2) with synthetic material to form said semifinished brush body (8); and wherein the step of covering the insert over its uncovered side with the synthetic material includes presenting the semifinished brush body formed in the first die (5) in which the insert is now at least partly enveloped by the synthetic material to a second die (9) with the uncovered portion of the insert within a die cavity (10) of the second die (9) and filling the second die (9) with synthetic material to mold the brush body (8); and further wherein the die cavities (4,10) of the first and second dies together define the shape of the brush body (1).

3. The method according to claim 2, wherein said clamping of the insert in the die wall of the first die includes clamping the insert (2) in such a way that it partly protrudes into the first die cavity (4).

4. The method according to claim 3, including preforming the insert (2) by injection molding the insert in an insert molding die (14), said insert molding die including a part (25) movable to the first die and arranged so as to function as the die wall (6) of the first die (5); and maintaining the insert (2) pre-formed in the insert molding die in said part (15) during the filling of the first die with synthetic material to partially cover the insert with synthetic material.

5. The method according to claim 4, including partly pushing the insert (2) out of said part (25) of said insert molding die (14) when said part is moved to the first die (5) so that the insert protrudes into the cavity of the first die.

6. The method according to claim 1, including using transparent synthetic material during said injection molding steps to enable the embedded insert (2) to be observable from outside the brush body while fully covered with said transparent synthetic material.

7. A device (19) for manufacturing brush bodies (1) made of molded synthetic material including at least one insert (2) embedded in each brush body, comprising:

at least a first die (5) including a first die molding cavity for molding a semifinished product (8) constituting a portion of each brush body (1);

an insert holding arrangement (15,20,25) organized to hold at least one insert (2) in the wall of said first die (5) during molding so that the insert protrudes into the first die molding cavity;

a second die (9) having a second die molding cavity configured to mold the brush body (1);

a movable transfer device (21) arranged to move each semifinished product (8) molded in the first die (5) together with said at least one insert (2) partly embedded therein after molding in the first die molding cavity from the first die (5) to the second die; and a filling means (32) for filling the die molding cavities with synthetic material.

8. A device according to claim 7, wherein said insert holding arrangement comprises cavities (7) in said wall (6) of said first die which exactly match the shape of the insert and thus enable sealing of the first die molding cavity (4) around the insert (2).

9. A device according to claim 8, including:

a third die (14) including a third die molding cavity configured for molding said at least one insert;

filling means (23,24) for filling the third die with synthetic moldable material to mold the insert;

said third die including an insert retaining element (15,25) arranged to temporarily hold the insert during molding in the third die and to partially release the insert in a subsequent molding step;

a movable transfer device (15,22) arranged to move each insert molded in the third die molding cavity together with said insert retaining element to the first die molding cavity die;

said insert retaining element comprising said insert holding arrangement; and an insert moving device (20) associated with the first die configured to move each insert partly out of the insert retaining element and into the first die cavity after the insert has been moved to said first die molding cavity and before the first die is filled with synthetic material.

10. A device according to claim 9, wherein the third die (14) comprises at least three parts, said parts including a movable plate (25) with a cavity (7) in the shape of each insert (2) to be molded in the third die and two closing elements (16,17) arranged to enclose said cavities during injection; said plate (25) comprising said insert retaining element; and said insert moving device comprises plungers (29) located along the outside of the die cavity of the first die (5) which can be positioned in the cavities (7) of the plate.

11. A device according to claim 10, wherein the first and third dies are openable from closed positions and plate (25) is supported for rotation between the third die in open position and the first die in open position.

12. A device according to claim 9, wherein said first, second and third dies are integrated into a common die block (19).

13. A device according to claim 7, wherein the movable transfer device includes a movable transfer part (34) locatable in the first die molding cavity that is envelopable by synthetic material in the first die molding cavity during molding of the semifinished product.

14. A device according to claim 7, wherein the movable transfer device includes transfer elements in the shape of pins (13) that are movable to locations for forming fiber receiving openings in each brush body.

15. A device according to claim 7, wherein the first and second dies are integrated into a common die block (19).

* * * * *